US005482662A

United States Patent [19]
Nakamura et al.

[11] Patent Number: 5,482,662
[45] Date of Patent: Jan. 9, 1996

[54] CONTROL METHOD FOR INJECTION MOLDING MACHINES

[75] Inventors: Nobuyuki Nakamura; Tsuyoshi Arai, both of Nagano, Japan

[73] Assignee: Nissei Plastic Industrial Co., Ltd., Nagano, Japan

[21] Appl. No.: 152,859

[22] Filed: Nov. 16, 1993

[30] Foreign Application Priority Data

Nov. 27, 1992  [JP]  Japan .................................. 4-341311

[51] Int. Cl.$^6$ .................................................. B29C 45/76
[52] U.S. Cl. ...................... 264/40.1; 264/328.1; 425/145
[58] Field of Search ................... 264/40.1, 40.5, 264/328.1; 425/135, 145, 150, 166

[56] References Cited

U.S. PATENT DOCUMENTS

| | | | |
|---|---|---|---|
| 4,290,986 | 9/1981 | Koschmann | 264/40.6 |
| 4,780,256 | 10/1988 | Sasaki et al. | 264/40.1 |
| 4,849,678 | 7/1989 | Kamiguchi et al. | 264/40.1 |
| 5,023,028 | 6/1991 | Kamiguchi et al. | 264/40.1 |
| 5,093,052 | 3/1992 | Würl et al. | 264/40.1 |
| 5,258,918 | 11/1993 | Giancola | 264/40.7 |

FOREIGN PATENT DOCUMENTS 4-131217  5/1992  Japan .

*Primary Examiner*—Jill L. Heitbrink

[57] ABSTRACT

When an injection speed (final control amount) of a screw as an object subjected to control which is controlled by an actuator, for example, an injection cylinder is controlled so as to be a set value of a previously set molding condition. An intermediate control amount for operating the injection cylinder, for example, a valve differential pressure of a servo valve is detected. An instruction value for operating and controlling the injection cylinder is determined by calculation processing by a computer functional unit on the basis of the detected valve differential pressure and the above-mentioned set value Vs. The determined instruction value is used to operate and control the injection cylinder. In addition, the injection speed is detected, and when a detected value of the detected injection speed reaches a previously set target value, feedback control is made on the basis of the detected value and the set value. Thereby the control similar to feedforward control is made in the transition period, while the feedback control is used together in the steady period, or switching to the feedback control only is performed.

7 Claims, 5 Drawing Sheets

CONTROL METHOD FOR INJECTION MOLDING MACHINES

BACKGROUND OF THE INVENTION

1. Field of the Invention

This invention relates to a control method for injection molding machines in which control is made such that a final control amount of an object subjected to control which is controlled by an actuator becomes a set value of a previously set molding condition.

2. Description of the Background Art

Generally, in an injection molding machine, for example, as disclosed in Japanese Patent Laid-open No. 4(1992)-131217, feedback control is made such that an injection speed (final control amount) of a screw (object subjected to control) which is controlled by an injection cylinder (actuator) becomes a set value of a previously set molding condition.

Such a control method will be explained with reference to a feedback control system as shown in FIG. 5. At first, a position of an injection cylinder (screw) 62 is detected by a position detector 61, and this detected value Dod is converted into speed information (detected value Vod) by a speed converting unit 63. A set value Vos of the injection speed as a molding condition and the detected value Vod are subjected to subtraction processing by a subracting unit 64. An obtained deviation value Voc is subjected to PID compensation by a PID compensating unit 65. Thereafter it is given to a servo valve 66. The servo valve 66 is used to make feedback control of the action of the injection cylinder 62. Incidentally, such control is executed in the same manner even in the case of an analog signal processing system or a digital signal processing system.

However, with respect to such a conventional control method, the control is made using the feedback control system including the PID compensating unit 62, so that in the case of the analog signal processing system, adjustment for determining a PID constant and the like is not easy. The adjustment is inevitably performed to make selection to moderation of whole characteristics. Therefore, it becomes difficult to set good characteristics for all ranges, which consequently results in such a weakness that an individual error and a mechanical error are apt to occur although it takes a considerable time. This, problem become conspicuous when a proportional servo valve in which the flow amount characteristic does not have a linear characteristic is used as the servo valve 66. On the other hand, in the case of the digital signal processing system (digital servo system) in which a control algorithm is executed and processed by a microcomputer, there has been such a weakness that it is difficult to execute the linear control in which calculation equations become linear. In addition, in the control system in which such PID compensation is made, as in an injection speed characteristic curve Fv, as shown in FIG. 3 by a two-dotted line, there has been such a weakness that the response property is bad, and highly accurate and highly stable control cannot be made due to occurrence of over shoot (or under shoot).

OBJECTS AND SUMMARY OF THE INVENTION

It is an object of this invention to provide a control method for injection molding machines in which especially the response property is enhanced during rising of the control, thereby occurrence of over shoot (or under shoot) is prevented, and stability and reliability can be remarkably enhanced.

It is another object of this invention to provide a control method for injection molding machines in which control accuracy and molding quality can be greatly enhanced throughout the whole control.

In order to achieve the objects, this invention is firstly characterized in that as a basic technique, when an injection speed (final control amount) of a screw 3 (object subjected to control) which is controlled by an actuator 2, for example, an injection cylinder 2c is controlled so as to be a set value Vs of a previously set molding condition, especially an intermediate control amount for operating the injection cylinder 2c, for example, a valve differential pressure ΔP of a servo valve 4 is detected, an instruction value Vc for operating and controlling the injection cylinder 2c is determined by calculation processing by a computer functional unit 5 on the basis of the detected valve differential pressure ΔP and the above-mentioned set value Vs, and the determined instruction value Vc is used to operate and control the injection cylinder 2c. Thereby it is possible to make control similar to feedforward control during a partial period in the injection step, especially during a transition period. Therefore, ordinary feedback control is not made during this period.

Alternatively, a control method according to another form of this invention is characterized in that in addition to the above-mentioned control method, the injection speed as the final control amount is detected, and when a detected value Vd of the detected injection speed reaches a previously set target value Ld, feedback control is made on the basis of the detected value Vd and the set value Vs. The injection speed due to the action of the injection cylinder 2c is detected, and when the detected value Vd detected reaches the previously set target value Ld (usually Ld<Vs), the feedback control based on the set value Vs and the detected value Vd is made. In the transition period, the control similar to feedforward control is made. While in the steady period, the feedback control is used together, or switching to the feedback control only is performed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The preferred embodiments of this invention will be presented and explained in detail on the basis of the drawings.

At first, a block diagram of an injection molding machine in which a control method according to this invention can be carried out will be explained with reference to FIG. 2.

Figure 2:
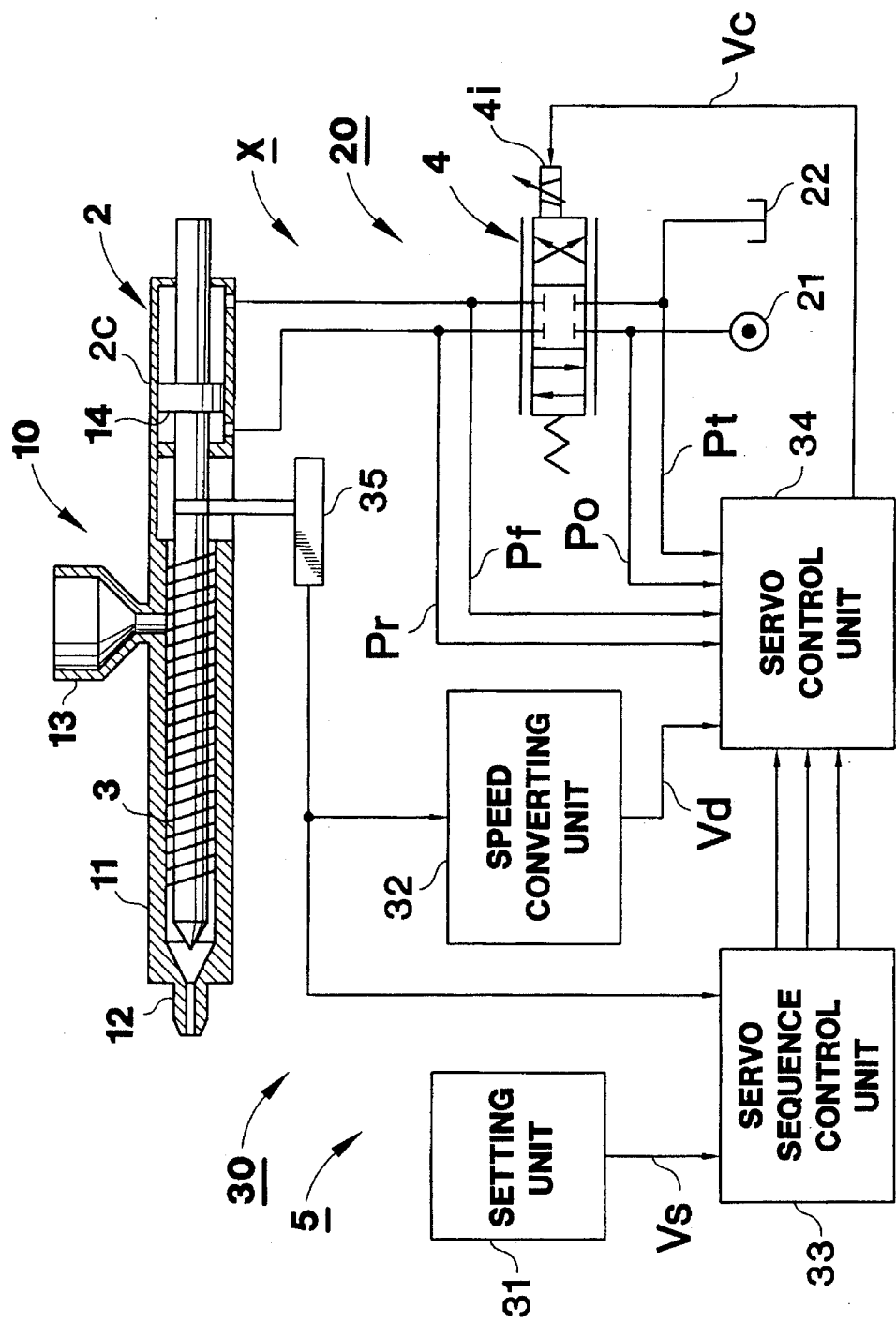
FIG. 2 is a block diagram of an injection molding machine in which the same control method can be carried out.

In FIG. 2, an injection apparatus 10 of the injection molding machine, is provided with a heating cylinder 11 at a front portion and a screw driving unit at a rear portion, respectively. Incidentally, FIG. 2 shows an injection cylinder 2c only in the screw driving unit. In addition, the heating cylinder 11 is provided with an injection nozzle 12 at the front end and a hopper 13 for supplying molding materials at the upper end of its rear portion, respectively, which is provided at the interior with a screw 3 freely capable of sliding. On the other hand, the injection cylinder 2c is provided with an injection piston 14 at the interior. The front end of this injection piston 14 connects with the rear end of the screw 3.

On the other hand, a control system X is constituted by a hydraulic pressure circuit 20 and a signal processing system 30. The hydraulic pressure circuit 20 is constituted by connecting a hydraulic pressure pump 21 and an oil tank 22 to a front chamber and a rear chamber of the injection cylinder 2c through four-port servo valve 4. In addition, the signal processing system 30 is constituted by a computer functional unit (computer unit) 5 as a whole, which is provided with a setting unit 31, a speed converting unit 32, a servo sequence control unit 33 and a servo control unit 34, and is provided with a position detector 35. In this case, the setting unit 31 is constituted by, for example, a keyboard, which sets various molding conditions, especially a set value Vs of the injection speed in relation to this example. Incidentally, various set data set by the setting unit 31 are given to the servo sequence control unit 33. In addition, the position detector 35 is constituted by, for example, using an absolute position linear scale, which performs position detection for the screw 3. Incidentally, detected position data are given to the servo sequence control unit 33 and the speed converting unit 32. In addition, the speed converting unit 32 is provided with a function to convert the position data given by the position detector 35 into speed information, and a detected value Vd of the injection speed obtained from the speed converting unit 32 is given to the servo control unit 34.

On the other hand, the servo sequence control unit 33 is provided with a function to give to the servo control unit 34 various control modes for executing sequence control in the control system X as well as speed set data, pressure set data and the like. In addition, to the servo control unit 34 are given detected values of a frontward movement pressure Pf and a rearward movement pressure Pr of the injection piston 14 (screw 3), an oil supply pressure Po of the hydraulic pressure pump 21 and a tank pressure Pt of the oil tank 22, respectively. An instruction value for operating and controlling the injection cylinder 2c as an output from the servo control unit 34, that is an instruction value Vc for the servo valve 4 is given to a control input unit 4i of the servo valve 4.

Figure 1:
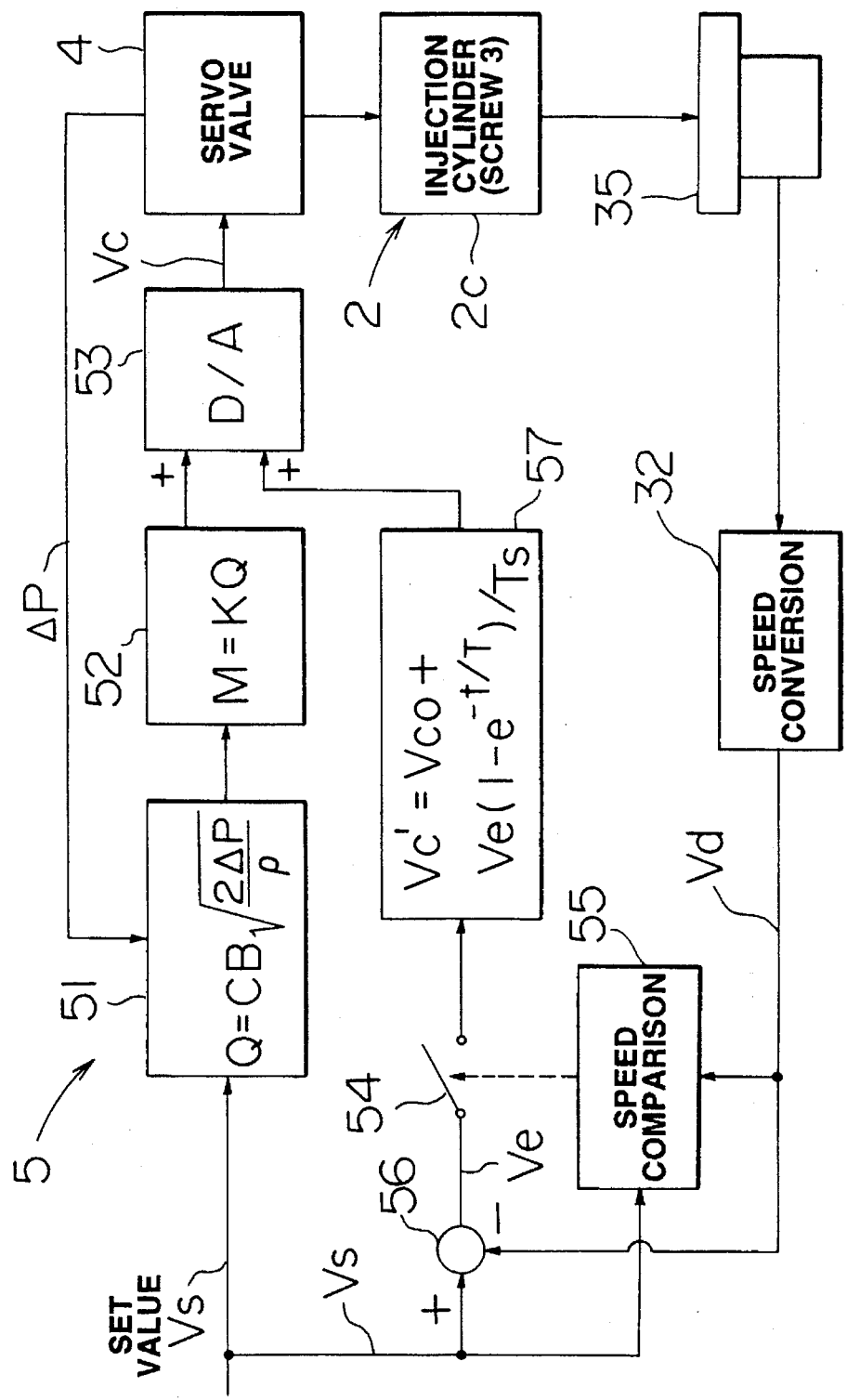
FIG. 1 is a functional block diagram for explaining a control method for injection molding machines according to this invention.

Next, the control method for the injection molding machine according to this invention will be explained with reference to the functional block diagram shown in FIG. 1. Incidentally, the example exemplifies the control method in a speed control region in the injection step as one example.

At first, after the start of the injection step, according to a set value Vs of the injection speed as a molding condition, a valve differential pressure $\Delta P$ of the servo valve 4, previously stored predetermined function equations (transfer functions for the transfer system and the like) and known constants, the computer functional unit 5 (servo control unit 34) operates and controls the injection cylinder 2c, namely determines an instruction value Vc (valve displacement M) to be given to the servo valve 4. Namely, the injection speed V can be represented by V=Q/S (Q: flow amount through the servo valve 4, S: area of the injection cylinder 2c), so that the flow amount Q can be determined from the set value Vs of the injection speed. The flow amount Q is proportional to an opening area of a spool of the servo valve 4 and a flow amount coefficient of the servo valve 4, which is proportional to a square root of one obtained by dividing 2-fold of a valve differential pressure $\Delta P$ of the servo valve 4 by an operation oil density r, so that the flow amount Q can be determined according to Q=CB÷2$\Delta$p/r (B: opening degree area of the servo valve 4). Incidentally, in this case, the valve differential pressure $\Delta P$ is determined according to $\Delta P$=Po-Pt-Pf (Po: oil supply pressure, Pt: tank pressure, Pf: frontward movement pressure (load pressure)).

Thus, when the set value Vs is given, the valve differential pressure $\Delta P$ is determined in real time, and the flow amount Q can be determined by calculation according to the previously stored known constants and the above-mentioned function equations (block 51). In addition, the flow amount Q and the valve displacement M of the servo valve 4 present a proportional relation, so that the instruction value Vc for the servo valve 4 is determined according to Vc=M=KQ (K: gain of the flow amount Q and the valve displacement M due to the valve differential pressure $\Delta P$) (block 52).

And the instruction value Vc (valve displacement M) thus obtained is converted into an analog signal by a digital-analog converting functional unit 53, and is given to the servo valve 4. Thereby especially from the start of the injection and during the transition period in the action of the injection cylinder 2c, the control similar to feedforward control is made for the valve differential pressure $\Delta P$ (intermediate control amount), and ordinary feedback control for the injection speed (final control amount) is not made. As a result, the servo valve 4 generates no delay, which is immediately set to a valve opening degree to obtain the set value Vs, and rapidly rises. Incidentally, in this case, a switching functional unit 54 in FIG. 1 is Switched to the open side.

Incidentally, the valve differential pressure $\Delta P$ is detected in real time and changes, so that after the start of the injection, the flow amount Q is changed at any time to control the servo valve 4. In this case, the valve differential pressure $\Delta P$ may be an absolute value, or may be determined as a change ratio, however, the change ratio is more preferable from a viewpoint of accuracy. In addition, when the valve differential pressure $\Delta P$ increases, the servo valve 4 is controlled in a direction to close. On the other hand, such pressure control (back pressure control) is made by proportional-plus-integral control. In the proportional-plus-integral control, a deviation value Ve is multiplied by a proportional gain Kp, and calculation of a sum of products is successively performed at every integral time to determine the instruction value Vc which is given to the servo valve 4. Namely, the instruction value Vc in this case is determined according to Vc=Ve+(Kp×Ve)/Ts.

On the other hand, the injection piston 14 and the screw 3 in the injection cylinder 2c make frontward movement under the control of the servo valve 4. The frontward movement position of the screw 3 is detected by the position detector 35, which is converted into speed information, that is the detected value Vd of the injection speed by the speed converting unit 32. And the obtained detected value Vd is given to a speed comparing unit 55. In addition, the set value Vs is given to the speed comparing unit 55, so that the speed comparing unit 55 obtains a target value (lower limit monitor line) Ld from the set value Vc by, for example, multiplying a constant coefficient (not more than 1), which compares this target value Ld with the detected value Vd, and switches the switching functional unit 54 to the closed side at a time point (time point of Tc in FIG. 3) at which the detected value Vd reaches the target value Ld.

Thereby a feedback control function based on the set value Vs and the detected value Vd is added. Namely, the deviation value Ve is determined from the set value Vs and the detected value Vd by a subtracting functional unit 56, first order lag integral calculation is performed on the basis of the deviation value Ve passed through the switching functional unit 54, and an auxiliary instruction value Vc is determined (block 57). In this case, the auxiliary instruction value Vc' is determined according to $Vc'=Vco+Vc\{1-e^{-(t/T)}\}/Ts$ (Vco: servo instruction value at the previous time, e: base constant of natural logarithm, t: sampling period, T: first order lag time constant, Ts: control time constant), so that the obtained auxiliary instruction value Vc' is converted into an analog signal by the digital-analog converting functional unit 53, which is given to the servo valve 4 in addition to the instruction value Vc. Thus, ordinary feedback control for the injection speed (final control amount) is added using the set value Vs and the detected value Vd. In such a manner, the feedback control is added in the steady period of the action of the injection cylinder 2c, and the feedback control for the final control amount (Vd) and the control similar to feedforward control for the intermediate control amount ($\Delta P$) are used together. In this case, the feedback control may be made alone.

Figure 3:
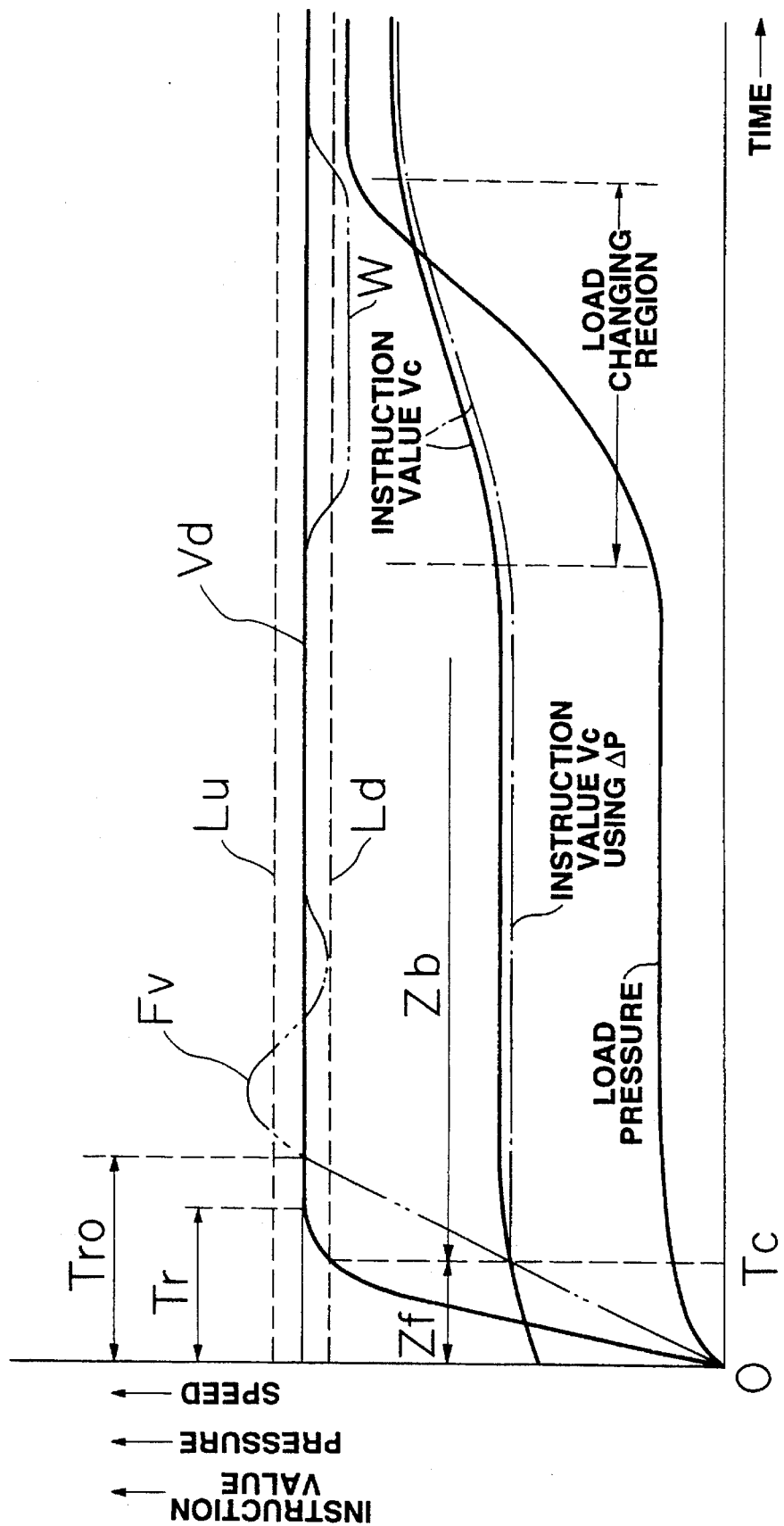
FIG. 3 is a graph illustrating of a control amount and the like with respect to time when control is made by the same control method.

In accordance with such a control method, the control characteristic of the injection speed (Vd) is as in FIG. 3. As clarified from FIG. 3, the control similar to feedforward control is made during the rising, the response time Tr becomes faster than a conventional response time Tro, the response property in the transition period is enhanced, the over shoot (or under shoot) disappears, and the stability is enhanced. In addition, in the steady period, the feedback control and the control similar to feedforward control are used together, so that the control accuracy is greatly enhanced. Furthermore, in FIG. 3, when a load change occurs, fluctuation W has occurred in the injection speed due to response delay in the case of feedback control by the conventional PID compensation, however, such inconvenience is dissolved in the case of the control method according to this invention. Incidentally, in FIG. 3, Lu indicates an upper limit monitor line, Zf indicates a region in which the control similar to feedforward control using the valve differential pressure $\Delta P$ is made, Zb indicates a region in which the feedback control is further used together, and Tc indicates a switching point of the switching functional unit 54.

For other things, with respect to the control time constant necessary for the calculation processing, a most suitable time constant is determined by performing learning for each set value, which is stored, read upon the change in the molding condition and used. In addition, it is also possible to successively compare the set value with the detected value while executing the control so as to determine a most suitable time constant. Furthermore, when a proportional servo valve is used, the time constant is set such that a valve displacement versus flow amount characteristic curve provides a linear characteristic.

Figure 4:
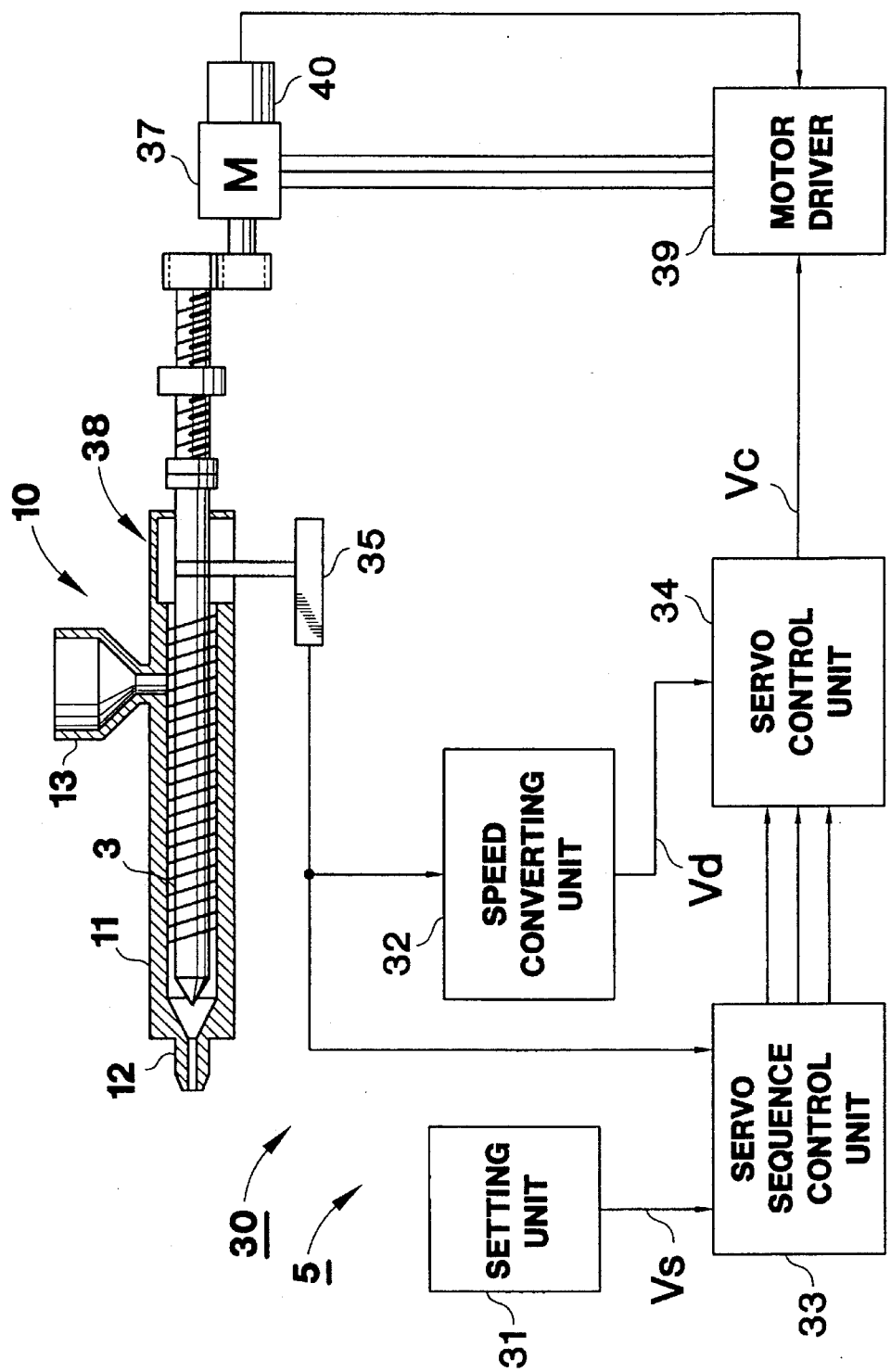
FIG. 4 is a block diagram of an injection molding machine according to an altered example in which the same control method can be carried out.
Figure 5:
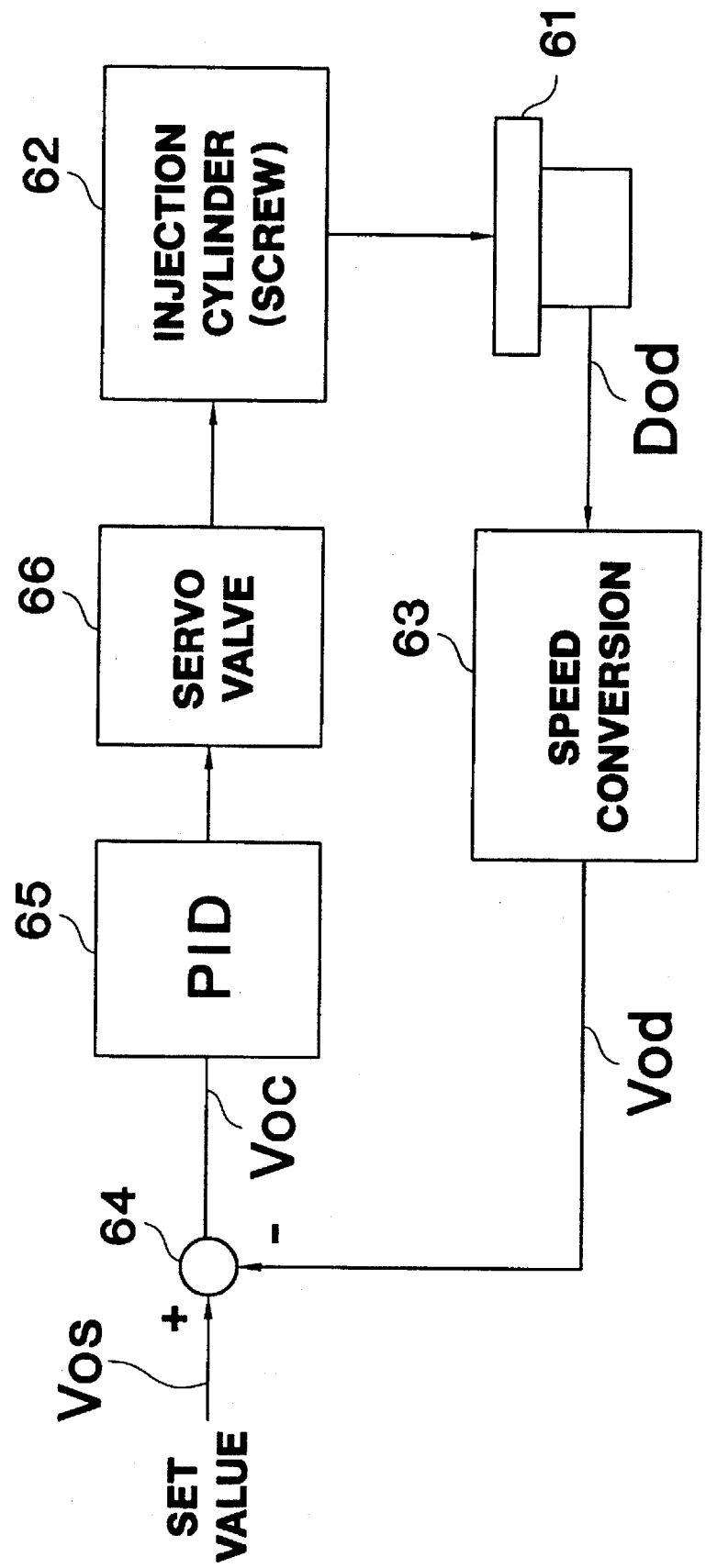
FIG. 5 is a functional block diagram for explaining a control method for an injection molding machine according to the prior art.

On the other hand, an altered example is shown in FIG. 4. The above-mentioned example shown in FIG. 2 has exemplified the hydraulic pressure type, however, the altered example presents an electric motor type. The case of the electric motor type can be also carried out basically in accordance with the case of the hydraulic pressure type except that the function equations and the constants are different. Incidentally, in FIG. 4, the same portions as those in FIG. 2 are designated by the same symbols. The case of the electric motor type is different from the hydraulic pressure type in that the screw 3 is moved by a servo motor 37 and a ball screw mechanism 38, and that a motor driver 39 for operating the servo motor 37 is provided, and the revolution number (revolution angle) of the servo motor 37 is detected by a rotary encoder 40, which is given to the motor driver 39 to make the control.

As described above, detailed explanation has been made for the examples, however, this invention is not limited to such examples. For example, the example have exemplified the injection speed as the control element, however, it is possible to carry out in the same manner also for other control elements such as a pressure, a position and the like. For other things, constitution, techniques and the like for details can be optionally changed within a range in which the spirit of this invention is not deviated.

We claim:

1. An injection control method for injection molding machines for controlling an injection speed of a screw by controlling an actuator:

detecting an intermediate control amount for operating the actuator;

determining an instruction value for operating and controlling the actuator by calculation processing by a computer functional unit on the basis of the detected intermediate control amount and a set value of a previously set molding condition of a functional formula and a predetermined constant;

detecting a value of the injection speed;

operating and controlling the actuator with the instruction value during an operation of the screw until the value of the detected injection speed reaches a previously set target value; and when the detected value of the injection speed reaches a previously set target value, operating and feedback controlling the actuator on the basis of the detected value of the injection speed and said set value.

2. The control method for injection molding machines according to claim 1 wherein the actuator is an injection cylinder.

3. The control method for injection molding machines according to claim 1 wherein the actuator is a servo motor.

4. The control method for injection molding machines according to claim 2, wherein the intermediate control amount is a valve differential pressure of a servo valve for operating and controlling the injection cylinder.

5. The control method for injection molding machines according to claim 3, wherein the intermediate control amount is a revolution number of the servo motor.

6. The control method for injection molding machines according to claim 1 wherein when the detected value of the injection speed reaches the previously set target value, switching is performed to the feedback control which is made on the basis of the deviation between the detected value of the injection speed and the set value.

7. The control method for injection molding machines according to claim 1, wherein when the detected value of the injection speed reaches the previously set target value, the feedback control of the actuator on the basis of the detected value of the injection speed and the set value is used together with open-loop control according to the instruction value.

* * * * *